May 17, 1932.  J. M. CREIGHTON  1,858,728
COCKTAIL SERVICE
Filed Jan. 21, 1931

INVENTOR.
J. M. Creighton
BY
ATTORNEY

Patented May 17, 1932

1,858,728

UNITED STATES PATENT OFFICE

JOHN M. CREIGHTON, OF MOUNDSVILLE, WEST VIRGINIA, ASSIGNOR TO FOSTORIA GLASS COMPANY, OF MOUNDSVILLE, WEST VIRGINIA

COCKTAIL SERVICE

Application filed January 21, 1931. Serial No. 510,080.

My invention relates to improvements in tableware, and more particularly to an article of tableware employed for serving iced foods, especially in the form of cocktails, as fruit, crabmeat, oyster and juice cocktails. Cocktail service of this character includes a bowl-like body adapted to contain cracked ice and a removable container for the iced food, the latter being designed to be positioned within the bowl and be surrounded by ice.

A prime object of the present invention is to provide a new and improved article of the character described, including means providing compartments for the ice, a compartment or chamber for the removable food container, assembled and constructed in a manner so that the food receptacle may be inserted and removed without necessitating the entire replacement of ice for each service or disturbing the cracked ice, and in a manner to prevent a ready removal or insertion of the food receptacle.

Other objects of my invention are, to provide a construction having common means for positioning and retaining the food receptacle in the desired centrally-disposed position within the bowl-like body, as well as functioning to provide compartments for the reception of the cracked ice; and to provide a simple and efficient construction that may, if desired, be formed entirely of glass.

Figure 1:
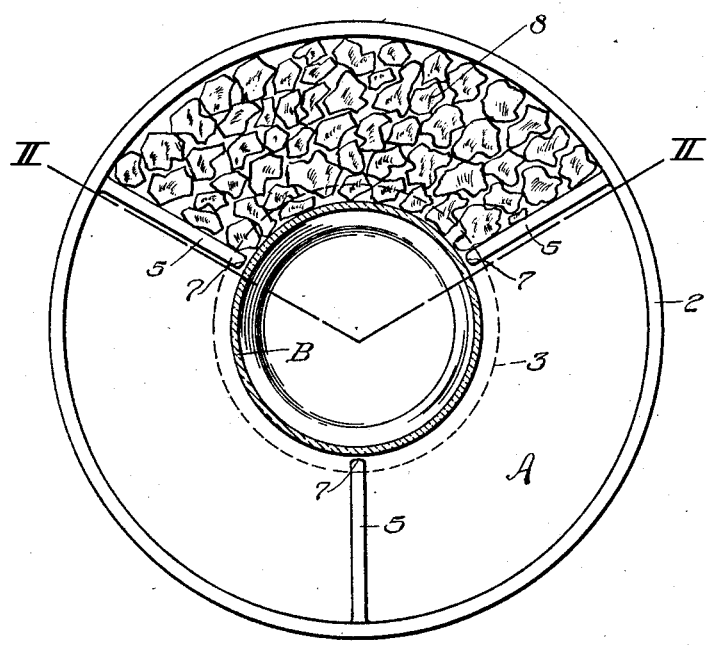
Figure 2:
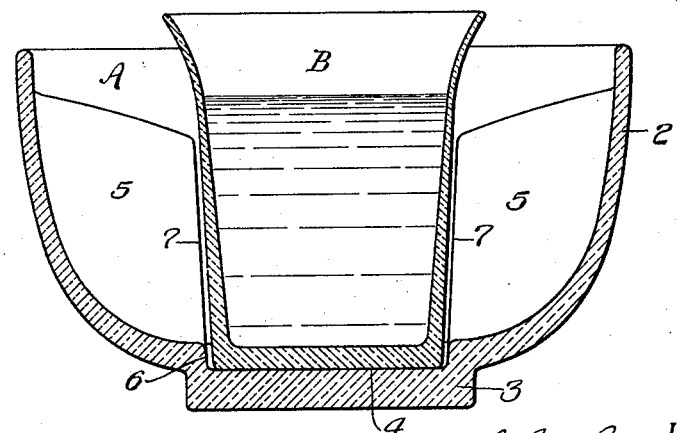

In the accompanying drawings, which illustrate an application of my invention:

Fig. 1 is a plan view of an ice bowl embodying my invention, showing a food receptacle positioned therein; and Fig. 2 is a vertical sectional view taken on the line II—II of Fig. 1.

Referring to the drawings, A designates generally an open topped bowl-like body or dish, having a closed bottom and designed to contain the cracked ice, the body being preferably formed of glass, although it will be understood that other materials may be used. As shown, the bowl-like body A is of generally circular shape, having a wall portion 2 and a base portion 3. However, my invention is not to be limited to any particular configuration of the body A, as various shapes and designs may be employed.

The base portion 3 is formed with a centrally disposed depression or socket 4 for receiving and positioning a separable cocktail glass or other food receptacle B therein. Cracked ice or other cooling medium may be packed around the receptacle B in the body A for the purpose of cooling the food contained in the receptacle.

In the usually employed prior constructions, no provision was made for retaining the ice in its packed relation around the food receptacle and, hence, upon re-use of the ice bowl, re-packing of the ice became necessary. Also, since the cracked ice afforded the only support for the receptacle, the receptacle was liable to tip and spill its contents.

To obviate these undesirable features, I have provided a construction embodying a plurality of inwardly converging or radial partitions 5, preferably formed as an integral part of the body. These partitions, as illustrated and as preferred, extend inwardly to the edge 6 of the receptacle socket 4 and have their inner vertically extending edges 7 free and spaced apart to provide a space or chamber to receive and retain the receptacle B. In the event that the receptacle B is slightly tapered, as shown in the drawings, the edges 7 may be correspondingly inclined, and are preferably spaced slightly from the said receptacle to permit the ready insertion and removal thereof; said edges, however, serving to prevent tipping of the receptacle B. In addition to providing the chamber for the receptacle, the partitions form compartments for the cracked ice.

In practice, a receptacle B is inserted between the edges 7 of the partitions and positioned in the receiving socket 4. Cracked ice or other refrigerant, diagrammatically illustrated at 8, is packed around said receptacle and comes into contact therewith between the partitions 5, as shown. Due to the fact that the partitions converge inwardly, the cracked ice in any compartment between any two partitions will be prevented from caving or falling inwardly upon the removal of the receptacle B for filling or re-use of the ice bowl or dish. In this manner, the cracked ice 8 is securely held in position and retained against obstruction of the opening between the partition edges 7 and the socket 4, thereby facilitating re-use of the ice dish.

I claim:

1. An article of manufacture including a bowl-like body having an open ended top and a closed bottom, and a plurality of fixed inwardly converting partition members disposed within the body forming compartments and receptacle-supporting means, said partition members having their inner edges free and spaced apart to provide a receptacle receiving space therebetween.

2. An article of manufacture including a body having an open ended top and a closed bottom, a plurality of partition members disposed within the body, said partition members having their inner edges free and spaced apart to form a receptacle-receiving space, an inner receptacle, said partition being of sufficient height to support the inner receptacle.

3. An article of manufacture including a relatively deep bowl-like body having an open ended top and a closed bottom, said bottom formed with a receptacle receiving socket, and a plurality of partition members disposed within the body of sufficient height to form compartments to retain ice and to support an inner receptacle, said members having their inner edges spaced apart to provide a receptacle receiving space therebetween.

4. An ice dish having wall and base portions, a food receptacle receiving socket in the base portion, and a plurality of inwardly converging partition members forming compartments for receiving and retaining cracked ice therein and around the socket, said members having free inner edges adjacent the socket to provide a space for positioning a food receptacle therein.

5. The combination with a separate food receptacle, of an ice dish including a body having an open ended top and a closed bottom, a plurality of converging partition members disposed within the body to form compartments for ice, said partition members having their inner edges free and spaced apart to provide a receptacle receiving space and be of sufficient height to support a receptacle and retain ice.

6. The combination with a separable food receptacle, of an ice dish including a body having an open ended top and a closed bottom, a plurality of converging partition members disposed within the body to form compartments for ice, said partition members having their inner edges free and spaced apart to provide a receptacle receiving space, said closed bottom formed with a socket, said receptacle entered in the receiving space and having its bottom disposed in the socket, and said partition members being of sufficient height to support the receptacle and retain ice.

In testimony whereof I affix my signature.
JOHN M. CREIGHTON.